US007962382B1

(12) United States Patent
Tancredi et al.

(10) Patent No.: US 7,962,382 B1
(45) Date of Patent: Jun. 14, 2011

(54) PAYMENT BROKER SYSTEM AND METHOD

(75) Inventors: Nancy Tancredi, Philadelphia, PA (US);
Luana Hubbart, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 303 days.

(21) Appl. No.: 12/218,755

(22) Filed: Jul. 17, 2008

Related U.S. Application Data

(60) Provisional application No. 60/961,539, filed on Jul. 20, 2007.

(51) Int. Cl.
*G06E 1/00* (2006.01)
(52) U.S. Cl. .............. 705/30; 705/40; 705/44; 709/203; 709/217
(58) Field of Classification Search .................... 705/30, 705/40, 44
See application file for complete search history.

(56) References Cited

U.S. PATENT DOCUMENTS 7,127,420 B1 * 10/2006 Foster ............................ 705/35
 2002/0029194 A1 * 3/2002 Lewis et al. .................... 705/39
 * cited by examiner

*Primary Examiner* — Vanel Frenel
(74) *Attorney, Agent, or Firm* — K&L Gates LLP

(57) ABSTRACT

A system and method of processing a payment request in a payment broker system wherein the payment broker system comprises a database and a unique finite state machine model, the model having states interconnected by transitions and actions and the request residing in the database of the payment broker system.

40 Claims, 11 Drawing Sheets

PAYMENT BROKER SYSTEM AND METHOD

CROSS-REFERENCE TO RELATED APPLICATIONS

This application claims the benefit of U.S. provisional patent application 60/961,539, filed Jul. 20, 2007, herein incorporated by reference.

FIELD OF THE INVENTION

The present invention relates to a payment broker system and method for transfer of funds, in particular to an electronic payment broker system and method for transfer of funds.

BACKGROUND OF THE INVENTION

Commercial customers send thousands of payment requests, valued at several billion dollars, to financial institutions every day for settlement, through payment origination systems. A financial institution such as a bank has many such payment origination systems to support a wide variety of business needs and customer channels such as the internet to service its customers. These systems in turn communicate with various payment systems such as wire transfer and Automated Clearing House (ACH) to settle and complete the payment request. Settlement is the process of debiting the account of the sender and in turn crediting the account of the receiver with the specified currency value. An account of a receiver may be with the any financial institution around the globe. The international and domestic businesses add more to the count of origination and payment systems.

Typically, payment origination systems are wired directly to every payment system and, hence, the maintenance and management of these systems is very expensive and difficult. The electronic payments business is also rapidly evolving, due to both technology developments and regulatory changes. As a result of this fluidity, multiple payment processing systems have, over time, become monolithic and redundant, with numerous connections directly between them. Consequently, a financial institution becomes saddled with an expensive payments platform, which is both time consuming to change and impossible to evolve to meet market demands.

SUMMARY OF THE INVENTION

The present invention relates to an electronic payment broker system and method for transfer of funds. The payment broker system comprises a database and a finite state machine model, the model having states interconnected by transitions and actions and a request for payment residing in the database of the payment broker system.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION OF THE PREFERRED EMBODIMENTS

Figure 1:
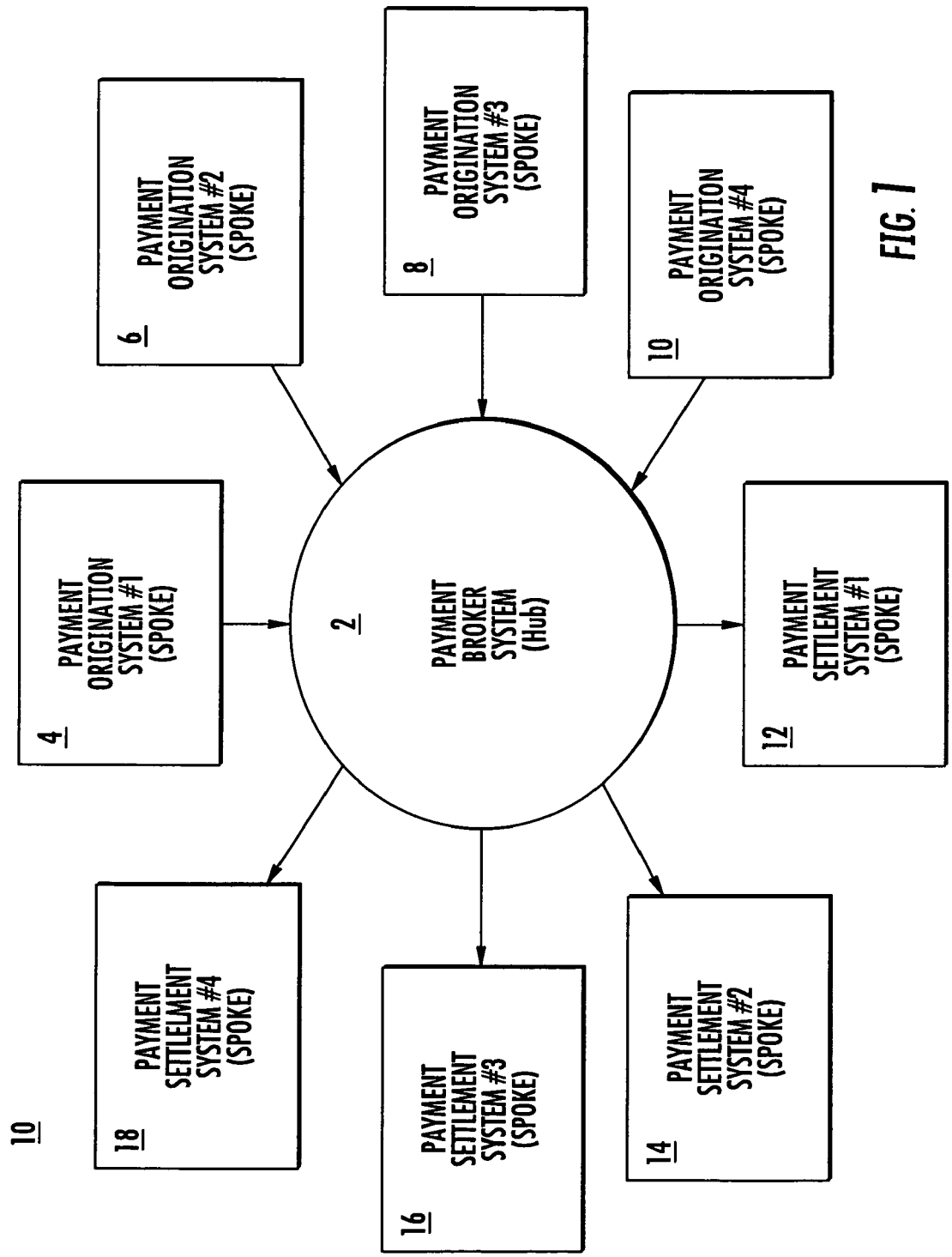
FIG. 1 is a block diagram generally illustrating the payment broker system in accordance with the present invention.

The following description of the embodiments of the present invention is merely exemplary in nature and is in no way intended to limit the invention, its application, or uses. The present invention has broad potential application and utility, which is contemplated to be adaptable across a wide range of industries. For example, it is contemplated that the payment broker system and method of the present invention would be beneficial for use by any institution that provides financial services including, but not limited to, a bank, savings and loan, and credit union. Additionally, it is contemplated that the system and method of the present invention would benefit other industries such as the retail industry. The following description is provided herein solely by way of example for purposes of providing an enabling disclosure of the invention, but does not limit the scope or substance of the invention.

The payment broker system and method of the present invention provides a financial institution, for example, with an electronic payment solution having flexibility. The payment broker receives electronically or by other computer or data transfer means a payment request from a payment origination system and routes the request to the appropriate payment system and ensures the request is completed. However, the payment broker system of the present invention is more than a router of information and data, but is a "broker" in that it manages and monitors the payment transaction. The payment broker system of the present invention also removes the need for connecting every payment origination system with every payment system. Instead, the payment broker system of the present invention connects to all these systems by providing a hub and spoke model with the payment broker being the central hub or repository that stores all payment requests in a database and the various payment systems as the spokes. As a result, payment solutions that used to take, for example, months to deliver may only take weeks using the payment broker system and method of the present invention.

Among the advantages of the payment broker system and method of the present invention to a financial institution are to offer a very flexible and nimble payables platform; to offer high-value solutions quickly and at a reduced cost; to reuse its software assets and technology investment; to build a sophisticated hub-and-spoke payments platform; to break technology system silos; to enable consolidation of duplicate business services, like Anti-Money Laundering scanning; to provide a complete and precise view into the business process for every payment request; to enhance the customer experience by empowering them with information when needed; and to lead the market by providing efficient, smart features, like least-cost routing between the various payment networks.

Thus, the payment broker system of the present invention provides a set of accelerators that enable the rapid assembly, integration and modification of payment processes. It is a middleware system that integrates various parties and systems that participate in a payment settlement. It manages the integration of existing and new payment applications. The payment broker system of the present invention enables management of the entire payment lifecycle and the business process in a single system. It routes payment requests from origination to payment systems. It monitors and tracks payment request state. It provides status information for every request at any time. It assists payment operators manage the payment request lifecycle.

Referring to the accompanying drawings:

FIG. 1 is a diagram generally illustrating the payment broker system 10 in accordance with the present invention. In FIG. 1, the payment broker system 2 is the central hub with respect to the activity of the payment broker system. As a hub, it serves as a central repository that holds payment requests. An unlimited number of initiating or payment origination systems may initiate payment activity with the payment broker system at any given point in time. FIG. 1 illustrates the hub-and-spoke form of the payment broker system 2 of the present invention. FIG. 1 is an example of the payment broker system in which there are four initiating or origination payment systems, namely Payment Origination System #1, Payment Origination System #2, Payment Origination System #3, and Payment Origination System #4. These payment origination systems are typically computer software applications and computer systems that represent spokes of the hub. As shown in FIG. 1, there are four outgoing payment settlement systems associated with this example, namely Payment Settlement System #1, Payment Settlement System #2, Payment Settlement System #3, and Payment Settlement System #4. The payment broker system of the present invention is not limited to any particular number of initiating or settlement systems. However, an advantage of the system and method of the present invention is the direct relationship between the payment broker system and the origination and settlement systems.

Figure 2:
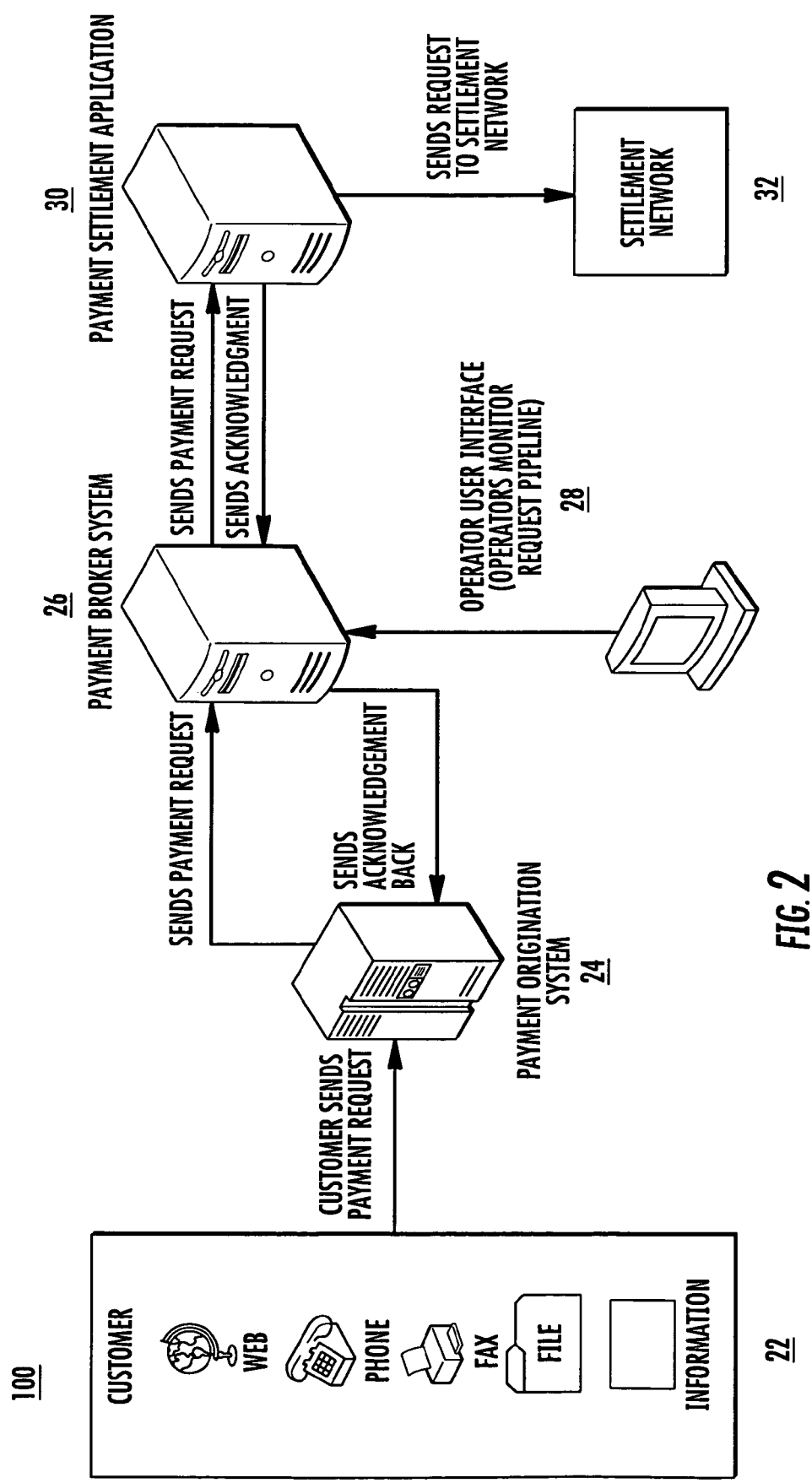
FIG. 2 is a block diagram illustrating the environment in which the payment broker method and system of the present invention operates.

FIG. 2 is a block diagram illustrating the environment 100 in which the payment broker method and system of the present invention operates. As shown in FIG. 2, a customer 22, a payment origination system 24, a payment broker system 26, an operator console 28, a payment settlement application 30, and a settlement network 32 are communicatively connected in an environment such that information and data may be communicated between them by electronic or other data transfer means.

The payment broker system 26 is primarily a combination of computer hardware and software that is configured to provide communication between the above mentioned components. Typically, the payment broker system resides on a server in a networked computer system. The computer hardware may comprise a variety of computer equipment including, but not limited to, a server, networked personal computers (PCs), and mainframe computers.

As shown in FIG. 2, a customer 22 or other requester sends a payment request to a payment origination system 24. The customer sends such a request through customer channels. Customer channels include, but are not limited to, the internet or world wide web, telephone, facsimile, data file, and any other form of conveying information from the customer or requester to the respective payment origination system. The payment origination system 24 sends a payment request to the payment broker system 26. Examples of payment origination systems include, but are not limited to, IPIR (Integrated Payables and Integrated Receivables), DDI (International Statements), SYI, loan syndication system, on-line banking systems such as "Wachovia Connection" for corporate customers of Wachovia Corporation, DFT (Funds Transfer System to initiate wire transfers). An operator user interface 28 monitors the request pipeline to the payment broker system 26. After the payment request arrives at the payment broker system 26, the payment broker system 26 sends the payment request to the payment settlement application 30. Examples of payment settlement applications include, but are not limited to, ACH (Automated Clearing House), IFT (International Funds Transfer international wire system), AQUA (European wire system), and MTS (domestic Money Transfer System). The payment settlement application 30 sends the payment request to the settlement network 32. Examples of settlement networks include, but are not limited to, the Federal Reserve Bank, Society for Worldwide Interbank Financial Telecommunication (SWIFT), and clearing house Interbank Payment System (CHIPS). The payment settlement application 30 sends an acknowledgement back to the payment broker system 26. The payment broker system 26 receives the acknowledgement and matches it with the original payment request. The payment broker system 26 sends that acknowledgement back to the payment origination system 24. The payment origination system 24 can send the acknowledgement back to the customer 22.

Figure 2A:
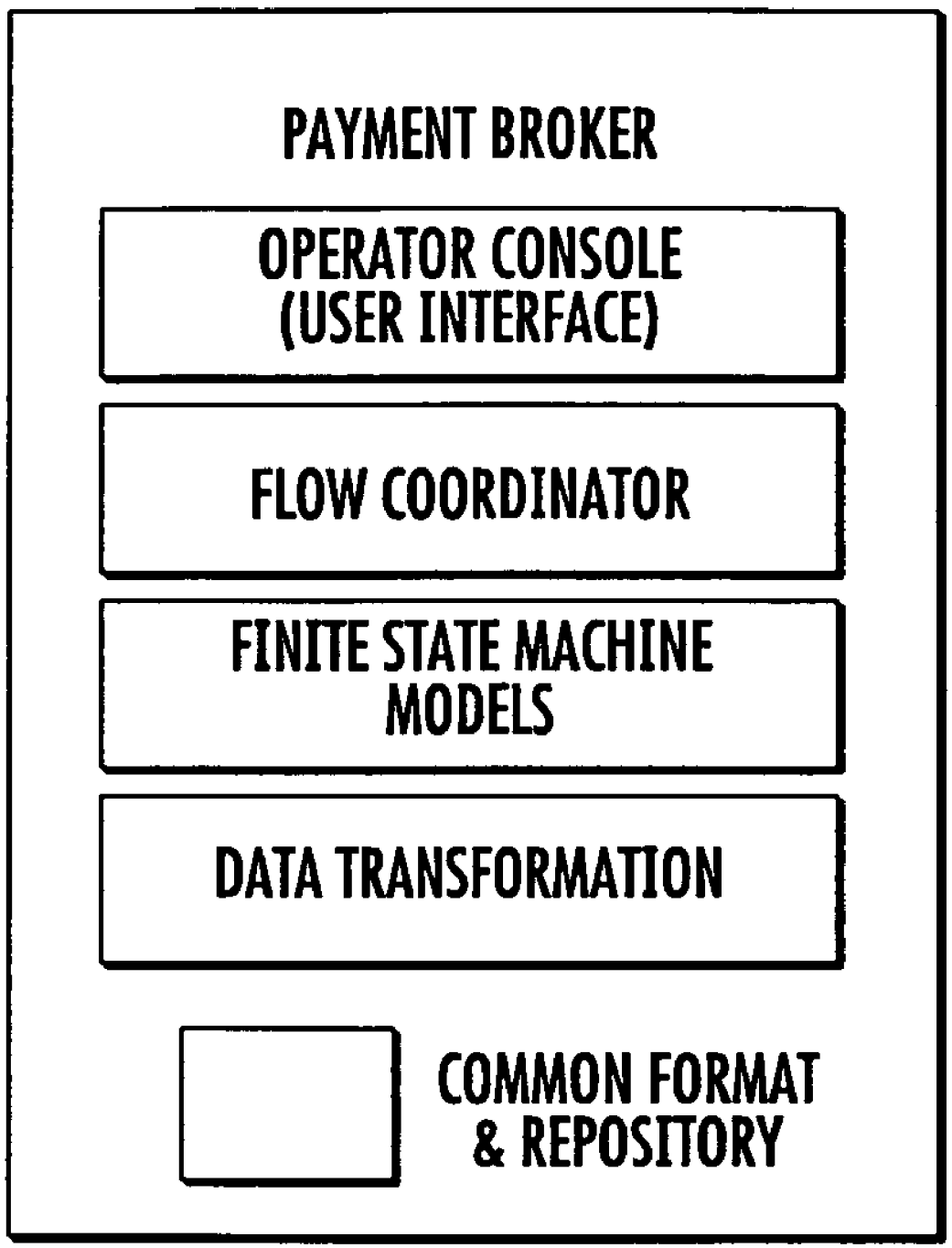
FIG. 2A is a block diagram illustrating the components of the payment broker system in accordance with the present invention.

As shown in FIG. 2A, the payment broker system generally comprises an operator user interface, a finite state machine model, a flow coordinator application, data transformation application, and a database. The operator user interface comprises a computer software application and device that an operator uses to monitor the request pipeline. For example, an operator can use the operator user interface to manage, monitor and track payment requests. It can also be used to configure the payment broker system.

The payment broker system of the present invention comprises a Finite State Machine (FSM) model which depicts the payment business process. An FSM is a model of behavior composed of a number of states, transitions between states, and actions. A "state" stores information about the past. It reflects the input changes from the system start to the present moment. A "transition" indicates a state change and is described by an event that needs to occur to enable the transition. An "action" is a description of an activity that is to be performed at a given moment. There are several action types. An "entry action" is performed when entering the state. An "exit action" is performed when exiting the state. An "input action" is performed depending upon the present state and input conditions. A "transition action" is performed when performing a certain transition. In each Finite State machine model, the double circle represents an entry action. The double circle with the shaded outer circle represents an exit action. An arrow represents movement or transition between states, and an event triggers the movement between states.

As indicated above, the payment broker system of the present invention operates using unique Finite State Machine (FSM) models that are translated into information and executable computer instructions. These models provide a financial institution more control over the payment process and how to manage the flow of payments from beginning to end. The solution insulates the various participant systems, making upgrades to systems relatively easy. It also enables a financial institution to quickly wire existing and new solutions. The FSM models describe the lifecycle of the payments business process, including what happens to a payment request, both anticipated and unanticipated. The models handle every condition a request can run into and also pave the way in and out of them. The models help track and execute every payment request from the second it arrives at the financial institution until it is completed.

As indicated above, the payment broker system comprises a flow coordinator application. The flow coordinator application is an executable software application that can execute FSM models.

The payment broker system also comprises a data transformation application. The data transformation application is a computer software application that converts a request from one data format to another. Examples of data transformation applications include, but are not limited to, WebSphere Business Integration Message Broker which is commercially available from IBM Corporation.

The payment broker system of the present invention also comprises a database. The database serves as a data repository to house all payment requests flowing through the payment broker.

The Finite State Machine models of the payment broker system may be used in conjunction with commercially available platforms and software. For example, the Electronic Payments Platform (EPP) of IBM Corporation may be used in conjunction with the FSMs of the present invention. Examples of commercially available software applications for use with the present invention include, but are not limited to, WebSphere Business Integration Message Broker, IBM WebSphere MQ for AIX, and DB2 UDB Database, each of which is commercially available from IBM Corporation.

Figure 3:
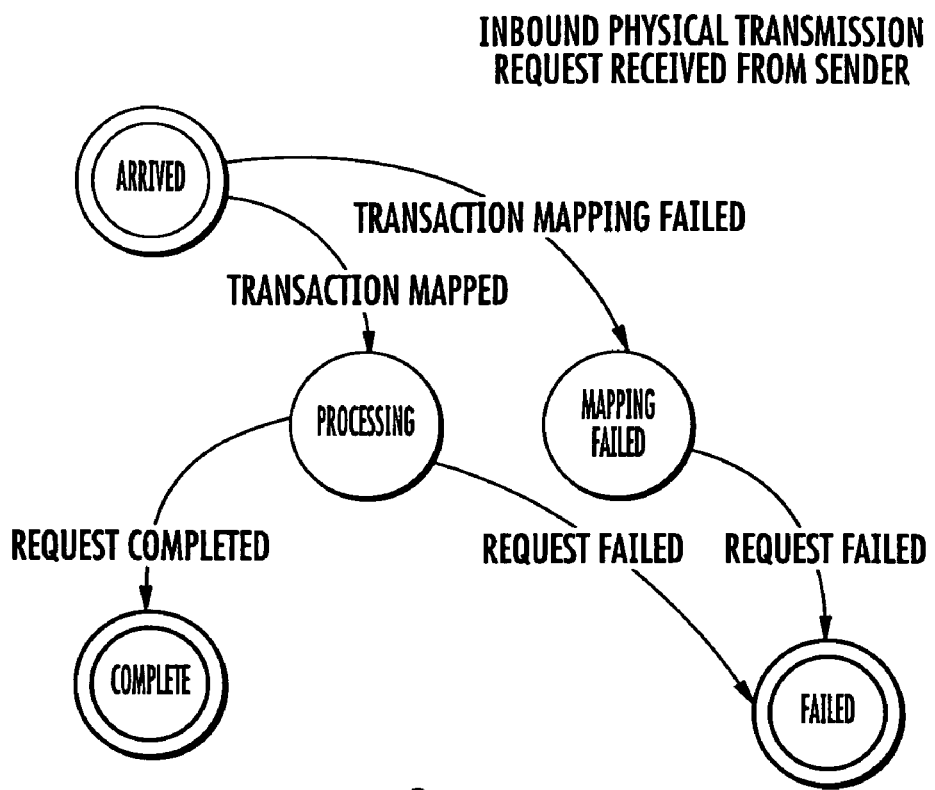
FIG. 3 is a finite state machine model of the present invention illustrating an inbound physical transmission request received by the payment broker from a sender.

FIG. 3 represents a Finite State Machine model of the present invention illustrating an inbound physical transmission request received by the payment broker system from a sender. According to FIG. 3, a payment request arrives at the payment broker system and resides in the database of the payment broker system. A Finite State Machine model also resides in the database of the payment broker system. According to the Finite State Machine model of FIG. 3, the arrival of the payment request at the payment broker system is an entry action. The state is "Arrived." After arriving at the "Arrived" state, an event may occur. Either the transaction is successfully mapped or the transaction mapping failed. The occurrence of an event triggers movement or a transition from one state to another state. If the transaction is mapped, then a transition occurs to the "Processing" state as shown in FIG. 3.

The term "mapping," as used herein, refers to mapping data from an input format to a payment broker format. The data transformation application is used for mapping. Once at the "Processing" state, one of either two events may occur, namely the sender request is completed or the sender request failed. If the sender request is completed then a transition occurs to the state of "Complete." If the request failed then a transition occurs to the state of "Failed." If the transaction mapping failed, then a transition occurs to the state of "Mapping Failed." Once the event of request failed occurs, there is a transition to the state of transaction "Failed."

Figure 4:
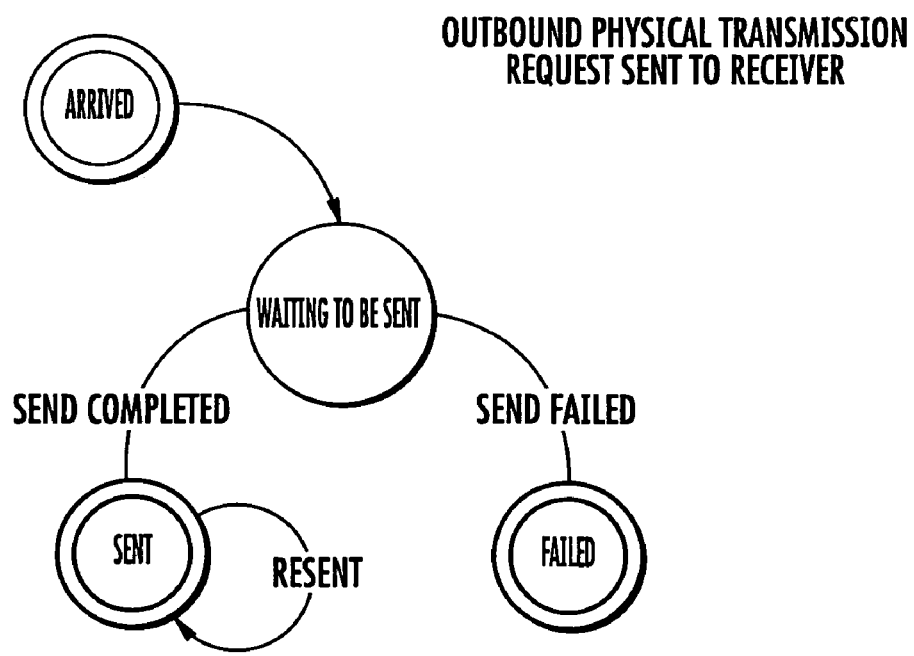
FIG. 4 is a finite state machine model of the present invention illustrating an outbound physical transmission request sent by the payment broker to a receiver.

FIG. 4 is a Finite State Machine model of the present invention illustrating an outbound physical transmission request sent by the payment broker system to a receiver. According to FIG. 4, the arrival of an outbound request by the payment broker system in an entry action, and the state is "Arrived." A transition then occurs to the state of request "Waiting to Be Sent." After arriving at this state, either one of two events occur. The send of the request is completed or the send of the request failed. If the send of the request is completed, a transition occurs to the state of "Sent." An event can also occur once the request is sent, namely the request is resent. If, however, the send failed, then there is a transition to the state of "Failed."

Figure 5:
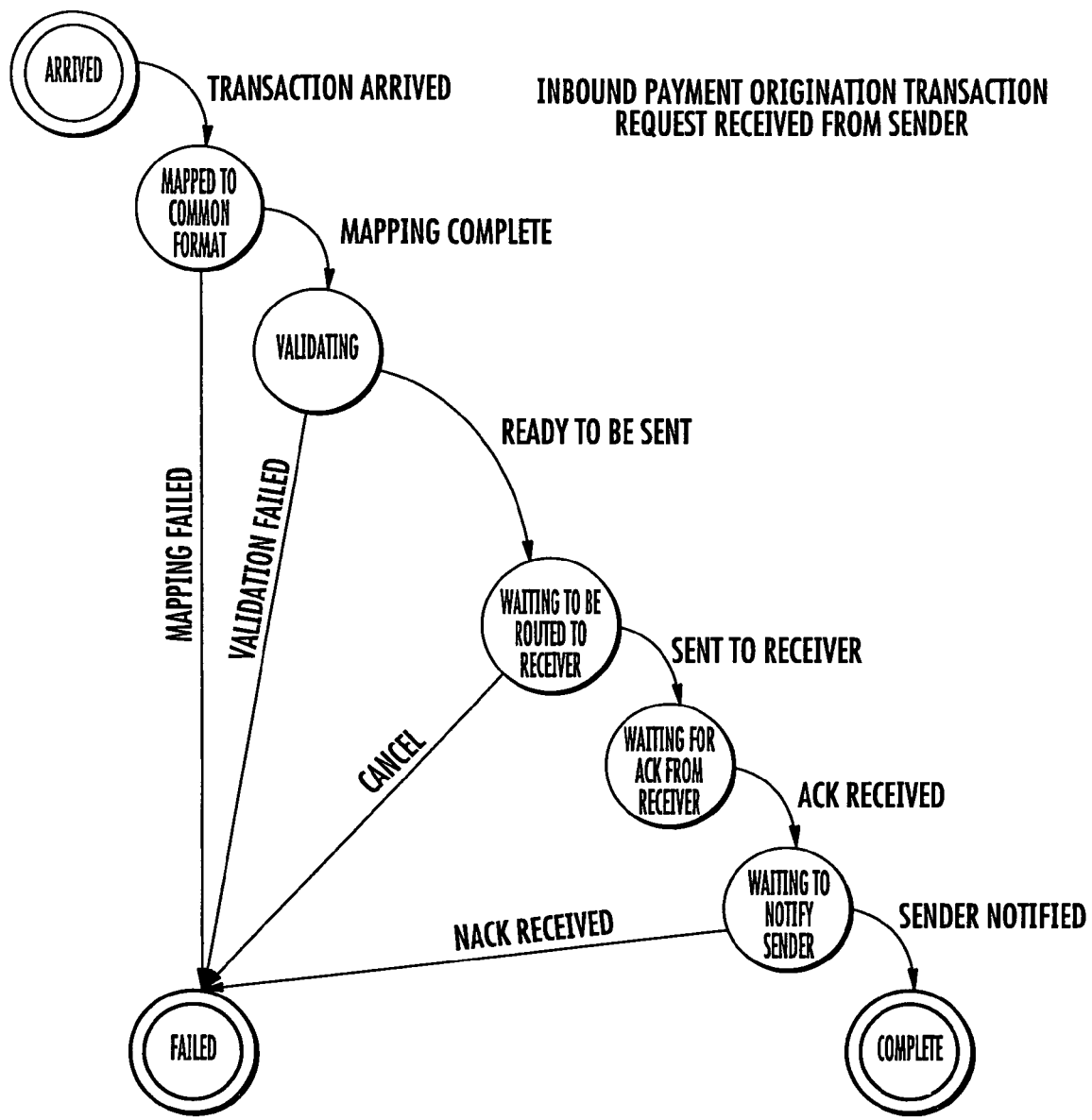
FIG. 5 is a finite state machine model of the present invention illustrating an inbound payment origination transaction request received by the payment broker from a sender.

FIG. 5 represents a Finite State Machine model of the present invention illustrating an inbound payment origination transaction request received by the payment broker from a sender. According to FIG. 5, the arrival of the inbound request is the entry action. The state is "Arrived." Once the request arrives, an event is that the transaction arrived. The occurrence of this event results in a transition to the state of "Mapped to Common Format." From the "Mapped to Common Format" state, one of two events may occur. Either mapping failed or mapping is complete. If mapping failed, there is a transition to the "Failed" state. If the mapping is complete then there is a transition to the "Validating" state. After reaching the "Validating" state, one of two events may occur. Either verification of the received message failed or it is ready to be sent. If ready to be sent occurs, then there is a transition to the "Waiting to Be Routed to Receiver" state. After the "Waiting to Be Routed to Receiver" state, one of two events may occur. The transaction is canceled by the operator or the transaction is sent to the receiver. If sent to receiver occurs, then there is a transition to the "Waiting for Acknowledgement From Receiver" state. Once the event of acknowledgement received occurs, there is a transition to the "Waiting to Notify Sender" state. After the "Waiting to Notify Sender" state, one of two events may occur. The sender is notified when an acknowledgement is received. If the event of "sender notified" occurs, then there is a transition to the state of "Completed." If a negative acknowledgement is received then there is a transition to the state of "Failed."

Figure 6:
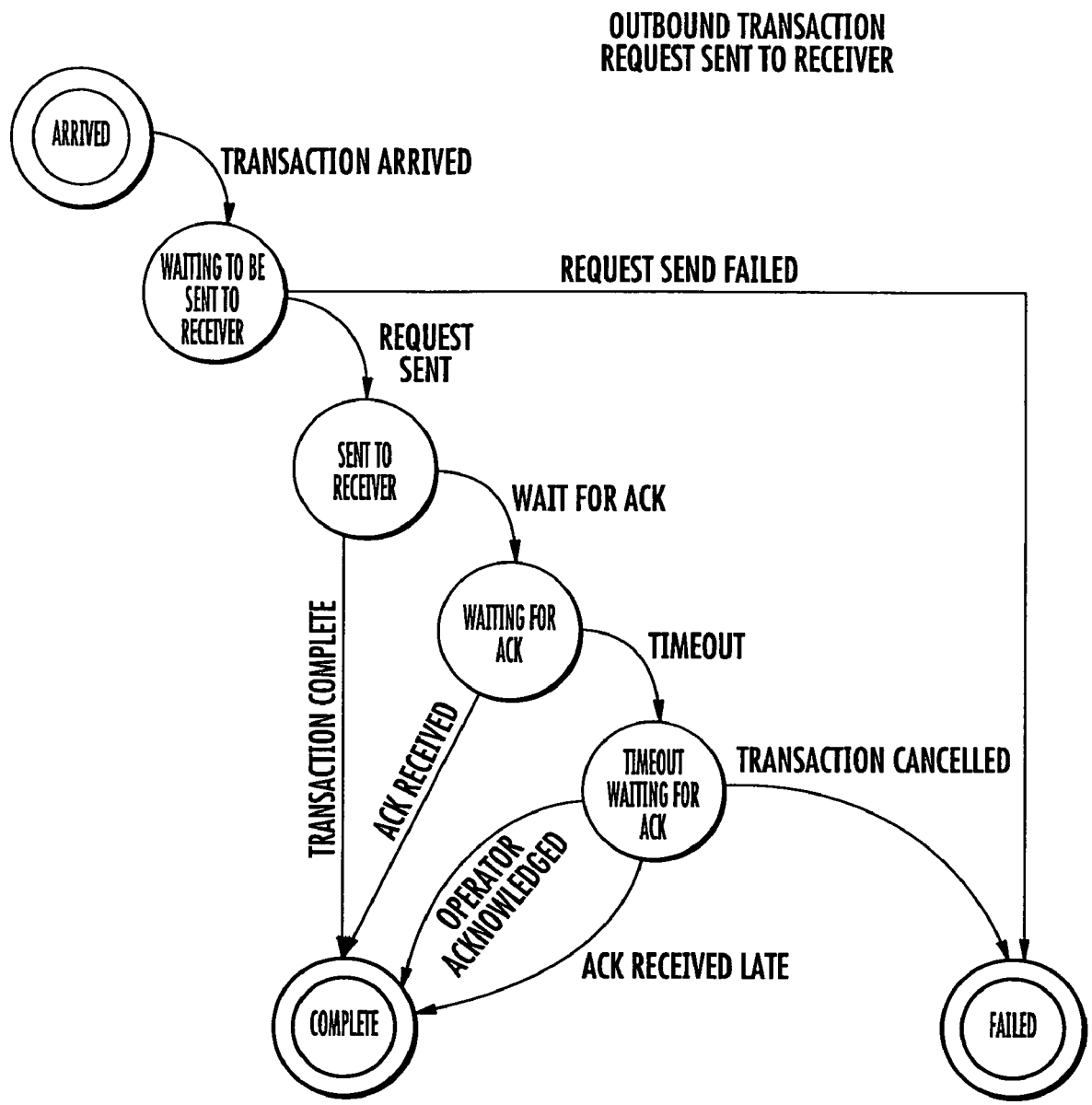
FIG. 6 is a finite state machine model of the present invention illustrating an outbound transaction request sent by the payment broker to a receiver.

FIG. 6 represents a finite state machine model of the present invention illustrating an outbound transaction request sent by the payment broker to a receiver. According to FIG. 6, the creation of the outbound request is the entry action, and the state is "Arrived." If the event of transaction arrived occurs, there is a transition to the "Waiting to Be Sent to Receiver" state. Once that state is reached, one of two events may occur, either the request send failed or the request was sent. If request send failed, there is a transition to the state of "Failed." If the request is sent, there is a transition to the "Sent to Receiver" state. Either one of two events may occur, either wait for acknowledgement or the transaction is complete. If the wait for acknowledgement occurs, either there is an event of timeout or an event of acknowledgement received. If acknowledgement is received, there is a transition to the state of "Complete." If timeout occurs, there is a transition to the state of "Timeout Waiting for Acknowledgement." Once this state is reached, there are several events that may occur. The transaction is cancelled and, if so, there is a transition to the state of "Failed." Alternatively, the acknowledgement is received late. If so, there is a transition to the state of "Complete." Alternatively, from the state of "Timeout Waiting for Acknowledgement," there is an event of the operator acknowledged the request. If this occurs, there is a transition to the state of "Complete."

Figure 7:
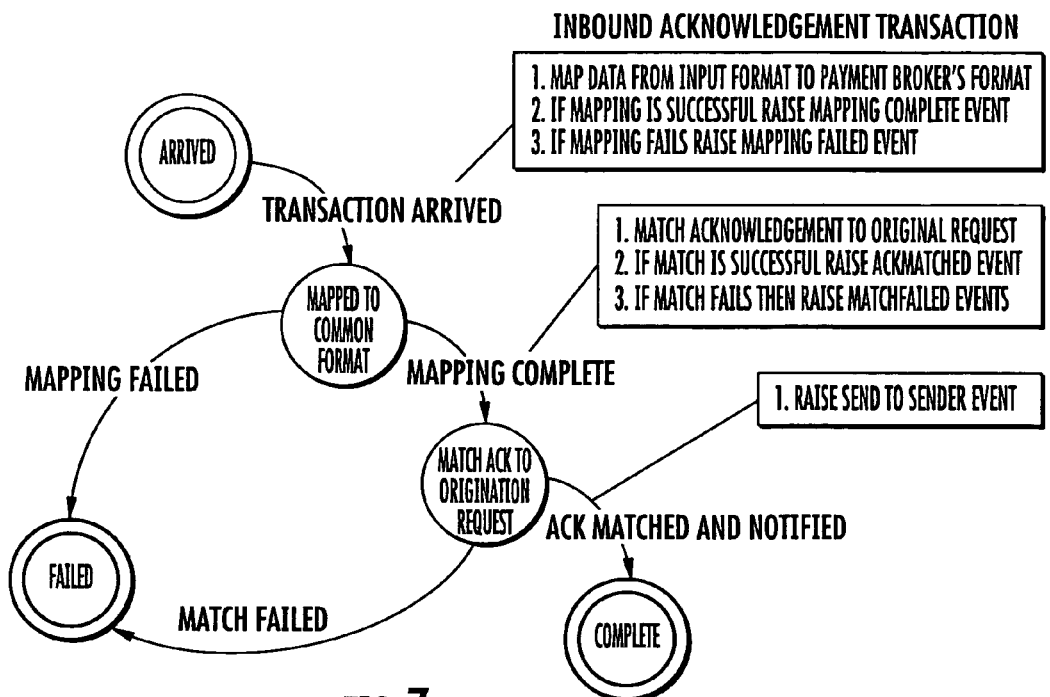
FIG. 7 is a finite state machine model of the present invention illustrating an inbound acknowledgement transaction received by the payment broker.

FIG. 7 represents a finite state machine model of the present invention illustrating an inbound acknowledgement transaction received by the payment broker. According to FIG. 7, the entry action is arrival and the state is "Arrived." Once arrived, the event of transaction arrived may occur. If this occurs, there is a transition to the state of "Mapped to Common Format." One of two events may occur, either mapping is complete or mapping failed. If mapping failed, there is a transition to the "Failed" state. If mapping is complete, there is a transition to the "Match Acknowledgement to Origination Request" state. After that state, the event of matched failed may occur and, if so, there is a transition to the state of "Failed." Alternatively, if the acknowledgement is matched and notified, there is a transition to the state of "Complete."

Figure 8:
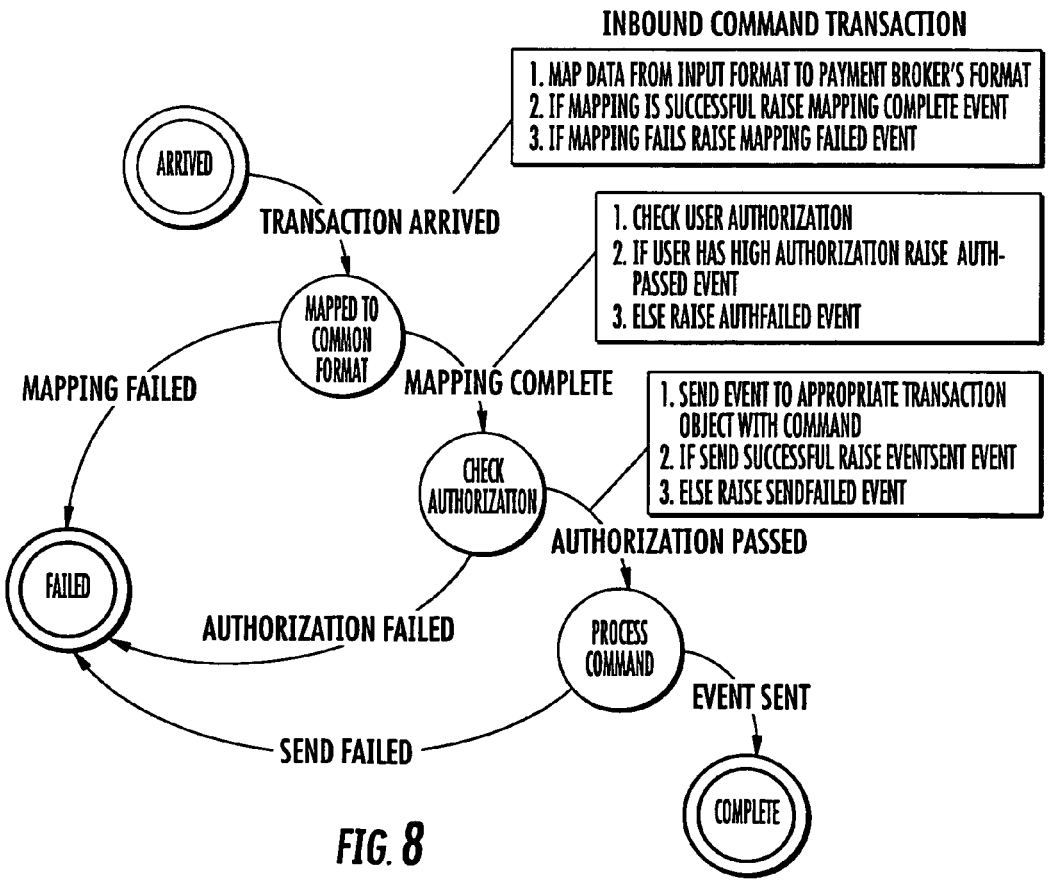
FIG. 8 is a finite state machine model of the present invention illustrating an inbound command transaction received by the payment broker.

FIG. 8 represents a finite state machine model of the present invention illustrating an inbound command transaction received by the payment broker. The entry action is the "arrival" of the payment request, and the state is "Arrived." If the transaction arrived, there is a transition to the state of "Mapped to Common Format." After that state, either the mapping failed event or the mapping is complete. If mapping failed, there is a transition to the state of "Failed." If the mapping is complete, there is a transition to the state of "Check Authorization." The events of authorization passed or authorization failed may occur. If the authorization failed, there is a transition to the state of "Failed." If authorization passed, there is a transition to the state of "Process Command." After the "Process Command" state, the event of sent may occur. If this occurs, there is a transition to the state of "Complete."

Figure 9:
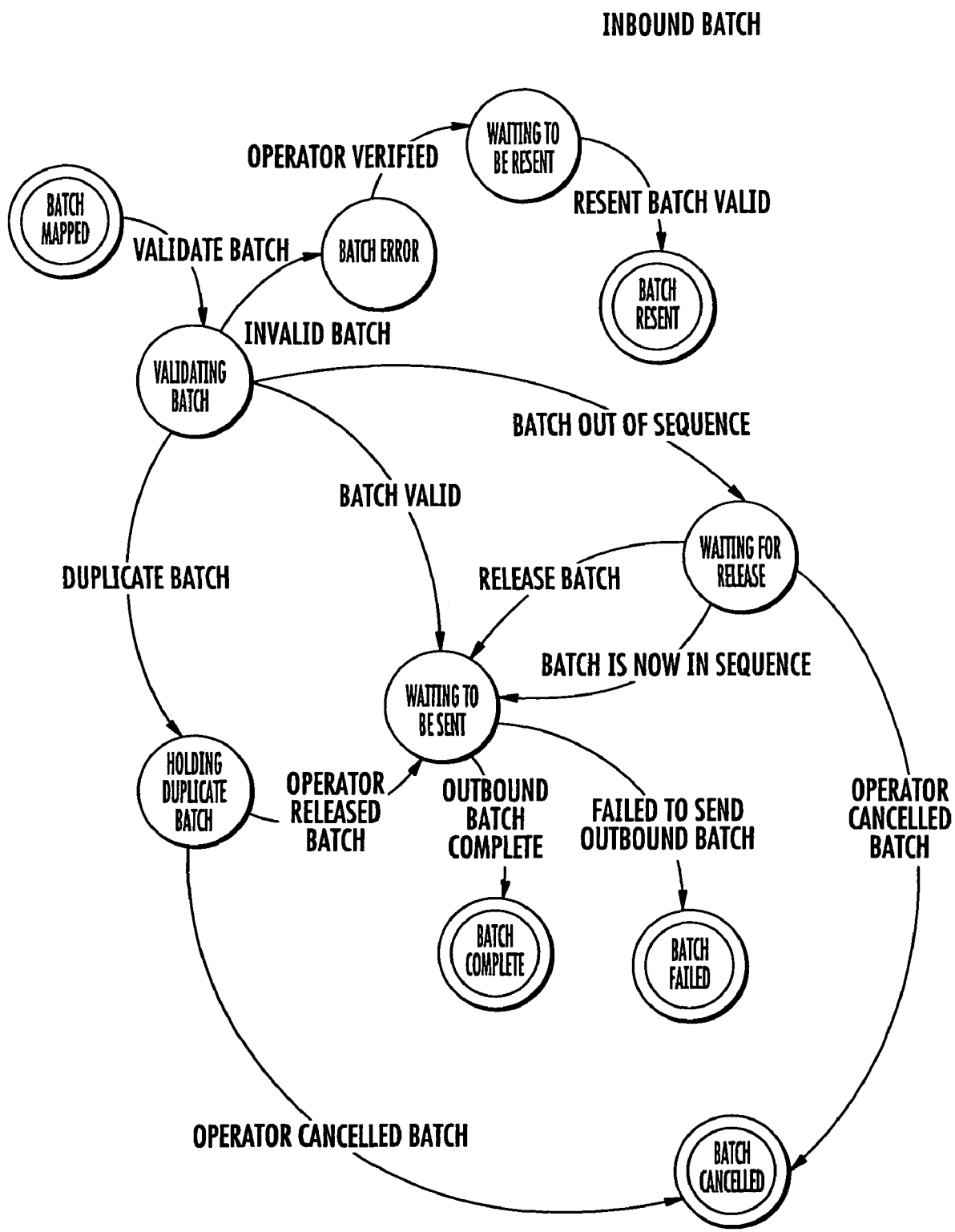
FIG. 9 is a finite state machine model of the present invention illustrating an inbound batch to the payment broker.

FIG. 9 of the present invention represents a finite state machine model of the present invention illustrating an inbound batch to the payment broker. FIG. 9 illustrates that the payment broker system of the present invention is applicable to batch processes in addition to real-time processes. As shown in FIG. 9, the entry action is an inbound batch and the state is "Batch is Mapped." If the event of validate batch occurs, then there is a transition to the "Validating Batch" state. Several events may occur, namely there is an invalid batch, a batch is out of sequence, the batch is valid, or there is a duplicate batch. If the event of invalid batch occurs, then there is a transition to the state of "Batch Error." If the event of operator verified occurs then there is a transition to the "Waiting to Be Resent" state. If the event of resent batch is valid, then there is a transition to the state of "Batch Resent." However, if the batch is out of sequence, then there is a transition to the "Waiting For Release" state. Once this state is reached, one of several events may occur. The batch is released, the batch is now in sequence, or the operator cancelled the batch. If operator cancelled batch occurs, then there is a transition to the state of "Batch Cancelled." If the batch is now in sequence, then there is a transition to the state of "Waiting To Be Sent." If the batch is released, there is a transition to the state of "Waiting To Be Sent." If from the "Validating Batch" state, the event of batch valid occurs, there is a transition to the "Waiting To Be Sent" state. If from the "Validating Batch" state, the event of duplicate batch occurs, there is a transition to the state of "Holding Duplicate Batch."

From the state of "Holding Duplicate Batch," one of two events may occur, namely, operator cancelled batch or operator released batch. If operator cancelled batch occurs, then there is a transition to the state of "Batch Cancelled." If, however, the operator released the batch occurs, there is a transition to the state of "Waiting To Be Sent." After the state of "Waiting to Be Sent," the events of outbound batch complete or failed to send outbound batch may occur. If the outbound batch complete occurs, there is a transition to the state of "Batch Complete." If, however, the failed to send outbound batch occurs, there is a transition to the state of "Batch Failed."

Figure 10:
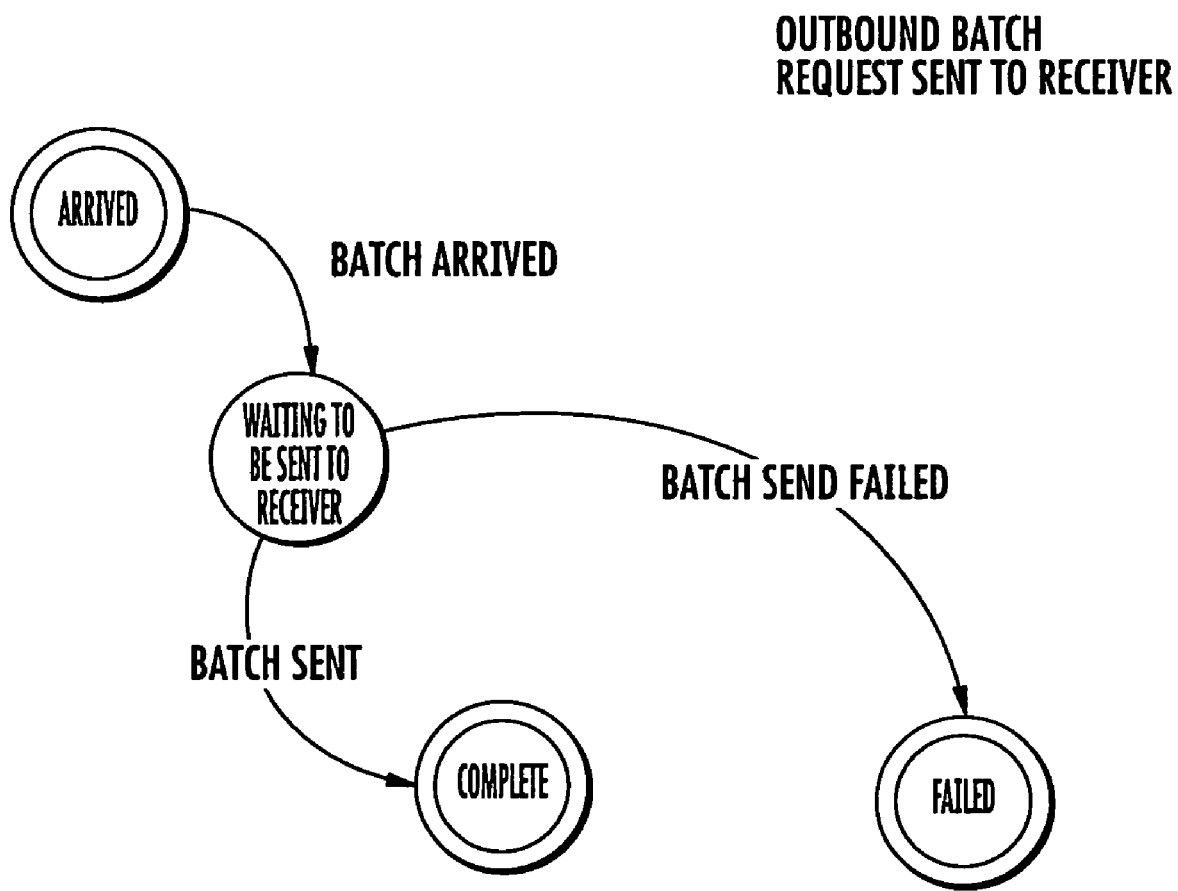
FIG. 10 is a finite state machine model of the present invention illustrating an outbound batch request sent by the payment broker to a receiver.

FIG. 10 represents a finite state machine model of the present invention illustrating an outbound batch request sent by the payment broker to a receiver. FIG. 10 illustrates that the payment broker system is applicable to an outbound batch transaction. As shown in FIG. 10, the state is "Arrived." Once at the "Arrived" state, the event of batch arrived may occur. If this occurs, then there is a transition to the state of "Waiting To Be Sent to Receiver." After this state, there may be the event of batch sent or batch failed. If batch sent occurs, then there is a transition to the state of "Complete." If the batch send failed occurs; then there is a transition to the state of "Failed."

Figure 11:
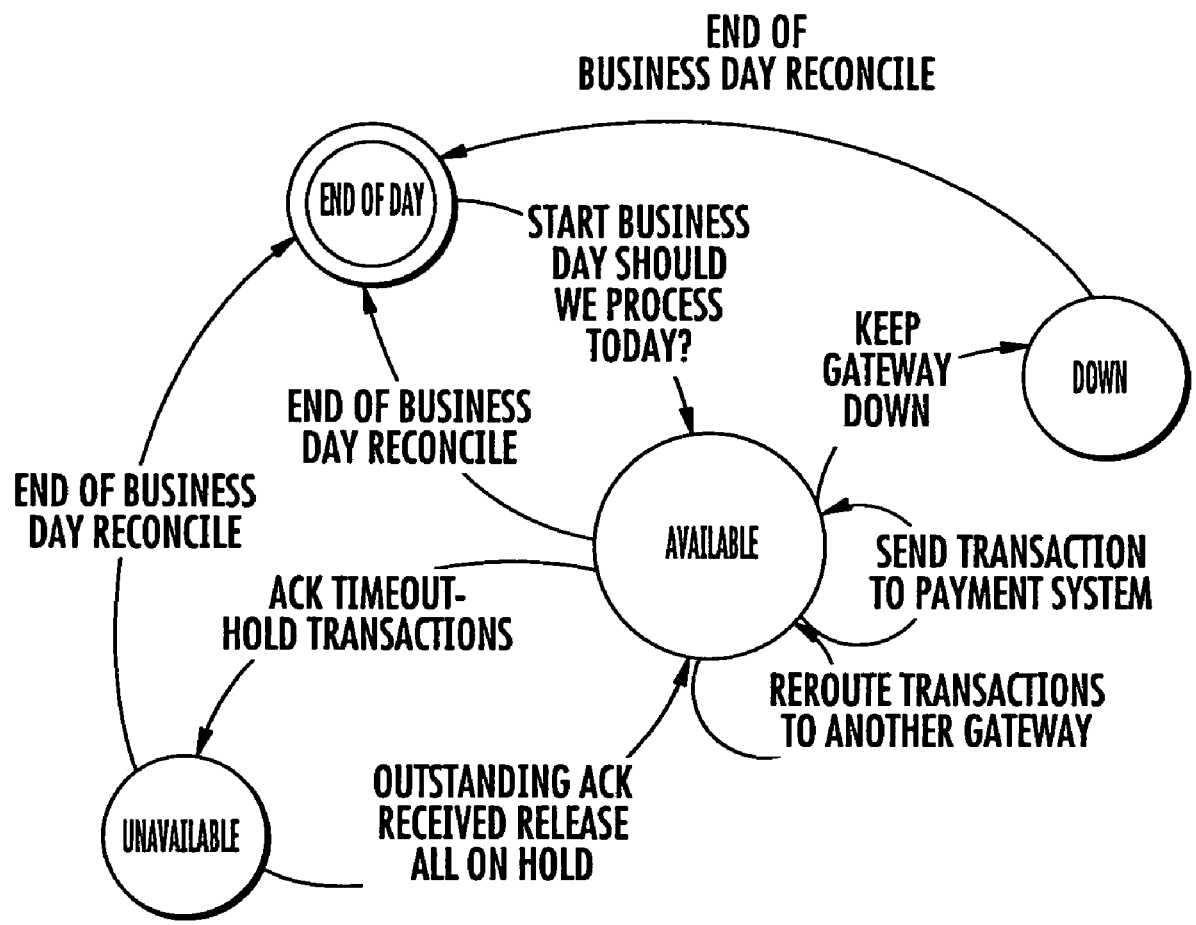
FIG. 11 is a finite state machine model of the present invention illustrating payment gateway participant logical entity that routes a request to a receiver.

FIG. 11 represents a finite state machine model of the present invention illustrating payment gateway participant logical entity that routes a request to a receiver. In particular, this illustrates what occurs when there is a payment request of the payment broker system at the end of day. As shown in FIG. 11, the state is "End of Day." The start of business day is an event that initiates a transition to the state of "Available." From the state of "Available," a number of events may occur such as keep gateway down, send transaction to payment system, re-route transactions to another gateway, acknowledge timeout (hold transactions), and end of business day reconcile. If the keep gateway down occurs, there is a transition to the state of "Down." From the state of "Down", if the end of day business day reconcile occurs, there is a transition to the state of "End of Day." If the reroute transactions to another gateway or send transaction to payment system occur, there is a transition back to the state of "Available." If the acknowledgement timeout (hold transactions) occurs, there is a transition to the state of "Unavailable." From the state of "Unavailable", if the end of business day reconcile occurs then there is a transition to the state of "End of Day." If from the state of "Available," the end of business day reconcile occurs, then there is a transition to the state of "End of Day."

Prophetic Example

Figure 12:
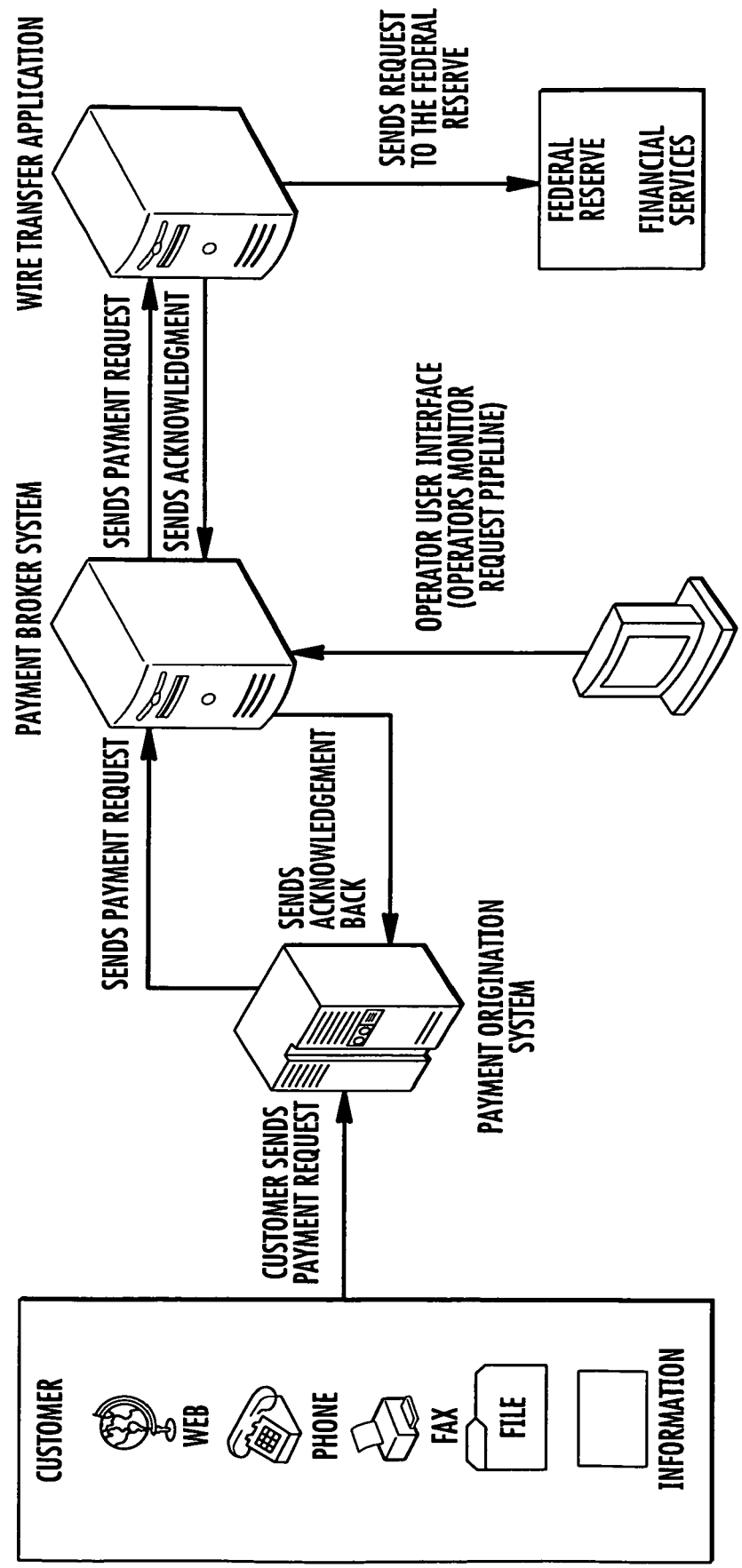
FIG. 12 is a block diagram illustrating the application of the payment broker system of the present invention to a wire transfer.

As shown in FIG. 12, a customer sends a payment request via a customer channel to the payment origination system of the financial institution. The request is processed by a payment origination system. The payment origination system forwards the request via WebSphere Message Queue (WMQ) which is a product of IBM Corporation or as files to payment broker system which runs on remote servers. The payment broker system receives the request and processes the request as specified in the Finite State Machine model for that type of payment request. The payment broker system transforms the data to its internal data format. Then the payment broker system validates the payment request to ensure the format and content are right. The payment broker system confirms that the payment is not a duplicate payment and that it is in sequence with its predecessor request. If all these tests pass, the payment broker system sends the request to the wire transfer system and waits for an acknowledgement. The wire transfer system processes the request and sends the request to a settlement network such as the Federal Reserve Bank for processing. The wire transfer system also sends an acknowledgement back to payment broker system. The payment broker receives the acknowledgement and matches it with the original payment request. The payment broker system sends that acknowledgement back to the payment origination system. The payment origination system sends the acknowledgement back to the customer.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended to or to be construed to limit the present invention or otherwise to exclude any such other embodiments, adaptations, variations, modifications and equivalent arrangements.

What is claimed is:

1. A method of processing a payment request in a payment broker system of a networked computer system, the method comprising:
   receiving from a sender at an arrived state an inbound request for a payment transaction by the payment broker system residing on a server in a computer network, wherein the payment broker system is in a hub-and-spoke configuration with the payment broker system being a central hub that stores a payment transaction request in a computer database and the spokes are one or more computer-based payment systems, the payment broker system further comprising a finite state machine model for depicting the payment process, the model having states interconnected by transitions and actions and the request residing in the database of the payment broker system,
   after arriving at the arrived state, mapping the transaction or failing to map the transaction,
   for a mapped transaction, transitioning the mapped transaction to a processing state or for a failed mapping transaction, transitioning the failed mapping transaction to a mapping failed state,
   for the mapped transaction after arriving at the processing state, completing the sender request or failing to complete sender request, and
   transitioning a completed sender request to a complete state or transitioning a failed sender request to a failed state.

2. The method according to claim 1, wherein after transitioning the failed mapping transaction to the mapping failed state, the method further comprising transitioning the failed request to the failed state.

3. A method of processing a payment request in a payment broker system of a networked computer system, the method comprising:
   receiving from a sender at an arrived state an outbound request for a payment transaction by the payment broker system residing on a server in a computer network, wherein the payment broker system is in a hub-and-spoke configuration with the payment broker system being a central hub that stores a payment transaction request in a computer database and the spokes are one or more computer-based payment systems, the payment broker system further comprising a finite state machine model for depicting the payment process, the model having states interconnected by transitions and actions and the request residing in the database of the payment broker system,
   after arriving at the arrived state, transitioning the outbound request to a waiting to be sent state,
   after arriving at the waiting to be sent state, completing the send or failing to complete the send, and
   for a completed send, transitioning the completed send to a sent state or for a failed send transitioning the failed send to a failed state.

4. The method according to claim 3, further comprising resending the completed send to the sent state.

5. A method of processing a payment request in a payment broker system of a networked computer system, the method comprising:
   receiving from a sender at an arrived state an inbound request for a payment origination transaction by the payment broker system residing on a server in a computer network, wherein the payment broker system is in a hub-and-spoke configuration with the payment broker system being a central hub that stores a payment transaction request in a computer database and the spokes are one or more computer-based payment systems, the payment broker system further comprising a finite state machine model for depicting the payment process, the model having states interconnected by transitions and actions and the request residing in the database of the payment broker system,
   after arriving at the arrived state, transitioning the inbound request transaction to a mapped to common format state,
   after arriving at the mapped to common format state, mapping the transaction or failing to map the transaction,
   transitioning a failed mapping to a failed state or the mapped transaction to a validating state,
   after arriving at the validating state, determining whether validation failed or whether the request is ready to be sent,
   transitioning a ready to be sent request to a waiting to be routed to receiver state,
   after arriving at the waiting to be routed to receiver state, cancelling the transaction by the operator or sending the transaction to the receiver,
   transitioning a request sent to the receiver to a waiting for acknowledgement from receiver state,
   after receipt of acknowledgement occurs, transitioning the acknowledgement received to a waiting to notify sender state,
   after arriving at the waiting to notify sender state, notifying sender when an acknowledgement is received or receiving a negative acknowledgement, and
   transitioning to a complete state if sender notified or to a failed state if a negative acknowledgement received.

6. The method according to claim 5, wherein after transitioning to the validating state, further transitioning a failed validation to the failed state.

7. The method according to claim 5, wherein after transitioning to the waiting to be routed to receiver state, further transitioning a cancelled transaction to the failed state.

8. A method of processing a payment request in a payment broker system of a networked computer system, the method comprising:

receiving from a sender at an arrived state an outbound transaction request by the payment broker system residing on a server in a computer network, wherein the payment broker system is in a hub-and-spoke configuration with the payment broker system being a central hub that stores a payment transaction request in a computer database and the spokes are one or more computer-based payment systems, the payment broker system further comprising a finite state machine model for depicting the payment process, the model having states interconnected by transitions and actions and the request residing in the database of the payment broker system, after arriving at the arrived state, transitioning the outbound request to a waiting to be sent to receiver state, after arriving at the waiting to be sent to receiver state, sending the request or failing to send the request, for a request sent, transitioning the sent request to a sent to receiver state, after arriving at the sent to receiver state, completing the transaction or waiting for acknowledgement, transitioning a waiting for acknowledgement to a waiting for acknowledgement state, after transitioning to the waiting for acknowledgement state, receiving an acknowledgement or experiencing a timeout, for the timeout, transitioning the timeout to the timeout waiting for acknowledgement state, and after transitioning to the timeout waiting for acknowledgement state, cancelling the transaction, receiving the acknowledgement late, or acknowledging the request by an operator.

9. The method according to claim 8, wherein after transitioning to the waiting to be sent to receiver state, the method further comprises transitioning a failed send request to the failed state.

10. The method according to claim 8, wherein after transitioning to the sent to receiver state, further transitioning a transaction complete to a complete state.

11. The method according to claim 8, wherein after transitioning to the waiting for acknowledgement state, further transitioning an acknowledgement received to the complete state.

12. The method according to claim 8, wherein after transitioning to the timeout waiting for acknowledgement state, further transitioning an operator acknowledged request to the complete state.

13. The method according to claim 8, wherein after transitioning to the timeout waiting for acknowledgement state, further transitioning an acknowledgement received late to the complete state.

14. The method according to claim 8, wherein after transitioning to the timeout waiting for acknowledgement state, further transitioning a cancelled transaction to the failed state.

15. A method of processing a payment request in a payment broker system of a networked computer system, the method comprising:

receiving from a sender at an arrived state an inbound acknowledgement transaction request by the payment broker system residing on a server in a computer network, wherein the payment broker system is in a hub-and-spoke configuration with the payment broker system being a central hub that stores a payment transaction request in a computer database and the spokes are one or more computer-based payment systems, the payment broker system further comprising a finite state machine model for depicting the payment process, the model having states interconnected by transitions and actions and the request residing in the database of the payment broker system, after arriving at the arrived state, transitioning arrived transaction to a mapped to common format state, after arriving at the mapped to common format state, mapping the transaction or failing to map the transaction, for a mapped transaction, transitioning to a match acknowledgement to origination request state, after arriving at the match acknowledgement to origination request, failing to match acknowledgement to request or matching acknowledgement to request, and transitioning to a complete state if the acknowledgement is matched or to a failed state if match failed.

16. The method according to claim 15, wherein after arriving at the mapped to common format state, further transitioning a failed mapping to the failed state.

17. The method according to claim 15, wherein transitioning to the complete state, further comprises notification.

18. A method of processing a payment request in a payment broker system of a networked computer system, the method comprising:

receiving from a sender at an arrived state an inbound command transaction request by the payment broker system residing on a server in a computer network, wherein the payment broker system is in a hub-and-spoke configuration with the payment broker system being a central hub that stores a payment transaction request in a computer database and the spokes are one or more computer-based payment systems, the payment broker system further comprising a finite state machine model for depicting the payment process, the model having states interconnected by transitions and actions and the request residing in the database of the payment broker system, after arriving at the arrived state, transitioning the arrived transaction to a mapped to common format state, after arriving at the mapped to common format state, mapping the transaction or failing to map the transaction, transitioning a mapped transaction to the check authorization state or a failed mapping to the failed state, after arriving at the check authorization state, passing authorization or failing authorization, transitioning a passed authorization to a process command state or a failed authorization to the failed state, after arriving at the process command state, sending event or failing to send event, and transitioning a sent event to a complete state or a failed sent event to the failed state.

19. A method of processing a payment request in a payment broker system of a networked computer system, the method comprising:

receiving from a sender at a batch mapped state an inbound batch transaction request by the payment broker system residing on a server in a computer network, wherein the payment broker system is in a hub-and-spoke configuration with the payment broker system being a central hub that stores a payment transaction request in a computer database and the spokes are one or more computer-based payment systems, the payment broker system further comprising a finite state machine model for depicting the payment process, the model having states interconnected by transitions and actions and the request residing in the database of the payment broker system, after arriving at the batch mapped state, transitioning a validated batch to a validating batch state, after arriving at the validating batch state, invalidating the batch, validating the batch, determining whether the batch is a duplicate, or determining if the batch is out of sequence, and transitioning a duplicate batch to a holding duplicate batch state, a valid batch to a waiting to be sent state, an out of sequence batch to the waiting for release state, or an invalid batch to a batch error state.

20. The method according to claim 19, after arriving at the holding duplicate batch state, cancelling batch by an operator or releasing batch by an operator.

21. The method according to claim 20, further comprising transitioning the operator cancelled batch to a batch cancelled state.

22. The method according to claim 20, further comprising transitioning the operator released batch to the waiting to be sent state.

23. The method according to claim 22, after arriving at the waiting to be sent state, the method further comprising completing the outbound batch or failing to send the outbound batch.

24. The method according to claim 23, further comprising transitioning a completed outbound batch to a batch complete state.

25. The method according to claim 19, after arriving at the waiting for release state, the method further comprising determining whether batch is in sequence, releasing the batch, or determining whether operator cancelled batch.

26. The method according to claim 25, further comprising transitioning a failed to be sent outbound batch to a batch failed state.

27. The method according to claim 25, after arriving at the waiting for release state, the method further comprising transitioning an operator cancelled batch to the batch cancelled state.

28. The method according to claim 19, after arriving at the batch error state, the method further comprising transitioning an operator verified batch to the waiting to be resent state.

29. The method according to claim 28, after arriving at the waiting to be resent state, the method further comprising transitioning a valid resent batch to a batch resent state.

30. A method of processing a payment request in a payment broker system of a networked computer system, the method comprising:

receiving from a sender at an arrived state an outbound batch request by the payment broker system residing on a server in a computer network, wherein the payment broker system is in a hub-and-spoke configuration with the payment broker system being a central hub that stores a payment transaction request in a computer database and the spokes are one or more computer-based payment systems, the payment broker system further comprising a finite state machine model for depicting the payment process, the model having states interconnected by transitions and actions and the request residing in the database of the payment broker system, after arriving at the arrived state, transitioning an arrived batch to a waiting to be sent to receiver state, after arriving at the waiting to be sent to receiver state, sending batch or failing to send batch, and transitioning a sent batch to a complete state or a failed batch send to a failed state.

31. A method of processing a payment request in a payment broker system of a networked computer system, the method comprising:

receiving at an available state a payment request transaction by the payment broker system residing on a server in a computer network, wherein the payment broker system is in a hub-and-spoke configuration with the payment broker system being a central hub that stores a payment transaction request in a computer database and the spokes are one or more computer-based payment systems, the payment broker system further comprising a finite state machine model for depicting the payment process, the model having states interconnected by transitions and actions and the request residing in the database of the payment broker system, and after arriving at the available state, keeping a gateway down, sending transaction to a payment system, re-routing transaction to another gateway, acknowledging timeout, holding transaction, or reconciling transaction.

32. The method according to claim 31, further comprising transitioning a keep gateway down to a down state.

33. The method according to claim 32, further comprising transitioning to end state.

34. The method according to claim 31, further comprising transitioning an acknowledge timeout and hold transaction to an unavailable state.

35. The method according to claim 34, further comprising transitioning to end state.

36. The method according to claim 31, further comprising transitioning a reroute transaction to another gateway back to available state.

37. The method according to claim 31, further comprising transitioning a send transaction to payment system back to available state.

38. The method according to claim 31, further comprising transitioning to end state.

39. A payment broker system in a networked computer environment for processing a request for an inbound payment transaction, the payment broker system residing on a server in a computer network, wherein the payment broker system is in a hub-and-spoke configuration with the payment broker system being a central hub that stores a payment transaction request in a computer database and the spokes are one or more computer-based payment stems the payment broker system further comprising a finite state machine model for depicting the payment process, the model having states interconnected by transitions and actions and computer-executed instructions for causing the payment broker system to:

receive from a sender at an arrived state an inbound request for a payment transaction by the payment broker system wherein the request resides in the database of the payment broker system, after arriving at the arrived state, map the transaction or fail to map the transaction, for a mapped transaction, transition the mapped transaction to a processing state or for a failed mapping transaction, transition the failed mapping transaction to a mapping failed state, for the mapped transaction after arriving at the processing state, complete the sender request or fail to complete sender request, and transition a completed sender request to a complete state or transition a failed sender request to a failed state.

40. A payment broker system in a networked computer environment for processing a request for an outbound payment transaction, the payment broker system residing on a server in a computer network, wherein the payment broker system is in a hub-and-spoke configuration with the payment broker system being a central hub that stores a payment transaction request in a computer database and the spokes are one or more computer-based payment systems, the payment broker system further comprising a finite state machine model for depicting the payment process, the model having states interconnected by transitions and actions and computer-executed instructions for causing the payment broker system to:

receive from a sender at an arrived state an outbound request for a payment transaction by a payment broker system wherein the payment broker system comprises a database and a finite state machine model, the model having states interconnected by transitions and the request residing in the database of the payment broker system, after arriving at the arrived state, transition the outbound request to a waiting to be sent state, after arriving at the waiting to be sent state, complete the send or failing to complete the send, and for a completed send, transition the completed send to a sent state or for a failed send transition the failed send to a failed state.

\* \* \* \* \*